(12) United States Patent
Sharma et al.

(10) Patent No.: US 12,307,619 B2
(45) Date of Patent: May 20, 2025

(54) SYSTEM AND METHOD FOR DETERMINING PERSONAL PROTECTIVE EQUIPMENT COMFORT

(71) Applicant: 3M INNOVATIVE PROPERTIES COMPANY, St. Paul, MN (US)

(72) Inventors: Ambuj Sharma, Woodbury, MN (US); Claire R. Donoghue, Twyford (GB); Stephen R. Gamble, Bishop Aukland (GB); Andrew W. Long, Woodbury, MN (US); Christine L. McCool, St. Paul, MN (US); Caitlin E. Meree, St. Paul, MN (US); Henning T. Urban, Kuehlungsborn (DE); Andrew S. Viner, St. Paul, MN (US); Richard C. Webb, St. Paul, MN (US); Caroline M. Ylitalo, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 192 days.

(21) Appl. No.: 18/007,213

(22) PCT Filed: Jul. 28, 2021

(86) PCT No.: PCT/IB2021/056865
§ 371 (c)(1),
(2) Date: Jan. 27, 2023

(87) PCT Pub. No.: WO2022/034418
PCT Pub. Date: Feb. 17, 2022

(65) Prior Publication Data
US 2023/0290091 A1    Sep. 14, 2023

Related U.S. Application Data

(60) Provisional application No. 63/065,781, filed on Aug. 14, 2020.

(51) Int. Cl.
*G06T 19/20* (2011.01)

(52) U.S. Cl.
CPC ...... *G06T 19/20* (2013.01); *G06T 2219/2021* (2013.01)

(58) Field of Classification Search
None
See application file for complete search history.

(56) References Cited

U.S. PATENT DOCUMENTS 7,827,038 B2    11/2010   Richard et al.
8,194,097 B2    6/2012    Xiao et al.
(Continued)

FOREIGN PATENT DOCUMENTS

CN    205031261 U    2/2016
KR    100509204 B1   8/2005
(Continued)

OTHER PUBLICATIONS

Xiong et al., "An indentation apparatus for evaluating discomfort and pain thresholds in conjunction with mechanical properties of foot tissue in vivo", JRRD vol. 47, No. 7, 2010 (Year: 2010).*
(Continued)

*Primary Examiner* — Yingchun He

(57) ABSTRACT

A method for determining personal protective equipment (PPE) comfort for an individual wearer includes defining a first anatomical shape data representative of an anatomical area of the individual wearer prior to donning a PPE, a second anatomical shape data representative of the anatomical area of the individual wearer after donning the PPE, and comparing the first anatomical shape data with the second anatomical shape data. The method further includes determining a soft skin tissue deformation at a plurality of predetermined anatomical positions based on the comparison between the first anatomical shape data and the second
(Continued)

anatomical shape data, and determining a displacement comfort threshold (CTd) value based on the soft skin tissue deformation. The method also includes determining a pressure pain threshold (PPT) value, and determining a comfort metric based on the PPT values and the CTd values. The method also includes generating a notification corresponding to the comfort metric.

20 Claims, 13 Drawing Sheets

(56) References Cited

U.S. PATENT DOCUMENTS

| | | | |
|---|---|---|---|
| 8,254,637 | B2 | 8/2012 | Abourizk et al. |
| 8,556,420 | B2 | 10/2013 | Sayag |
| 9,149,224 | B1 | 10/2015 | Newman et al. |
| 9,361,411 | B2 | 6/2016 | Thiruvengada et al. |
| 9,761,047 | B2 | 9/2017 | Bai et al. |
| 10,235,801 | B2 | 3/2019 | Ebisawa |
| 10,353,662 | B2 | 7/2019 | Snyder |
| 10,373,386 | B2 | 8/2019 | Tepmongkol et al. |
| 2014/0278320 | A1 | 9/2014 | Wang |
| 2016/0070851 | A1 | 3/2016 | Wang et al. |
| 2016/0162604 | A1 | 6/2016 | Xiaoli |

FOREIGN PATENT DOCUMENTS

| | | |
|---|---|---|
| WO | 2009150670 A1 | 12/2009 |
| WO | 2015195303 A1 | 12/2015 |

OTHER PUBLICATIONS

EP Application No. EP 21 85 5694 Supplementary European Search Report, Date of Completion of the Search: Jul. 22, 2024, 4 pages.
International Search Report for PCT International Application No. PCT/IB2021/056865, mailed on Nov. 1, 2021, 3 pages.
Koo, "Test-Retest Reliability, Repeatability and Sensitivity of an Automated Deformation-Controlled Indentation on Pressure Pain Threshold Measurement", Journal of Manipulative and Physiological Therapeutics, Feb. 2013, vol. 36, No. 2, pp. 84-90.
Lei, "A Novel Algorithm for Determining Contact Area Between a Respirator and a Headform", Journal of Occupational and Environmental Hygiene, Apr. 2014, vol. 11, No. 4, pp. 227-237.
Xu, "Estimating the dead space volume between a headform and N95 filtering facepiece respirator using microsoft kinect", Journal of Occupational and Environmental Hygiene, Aug. 2015, vol. 12, No. 8, pp. 538-546.

* cited by examiner

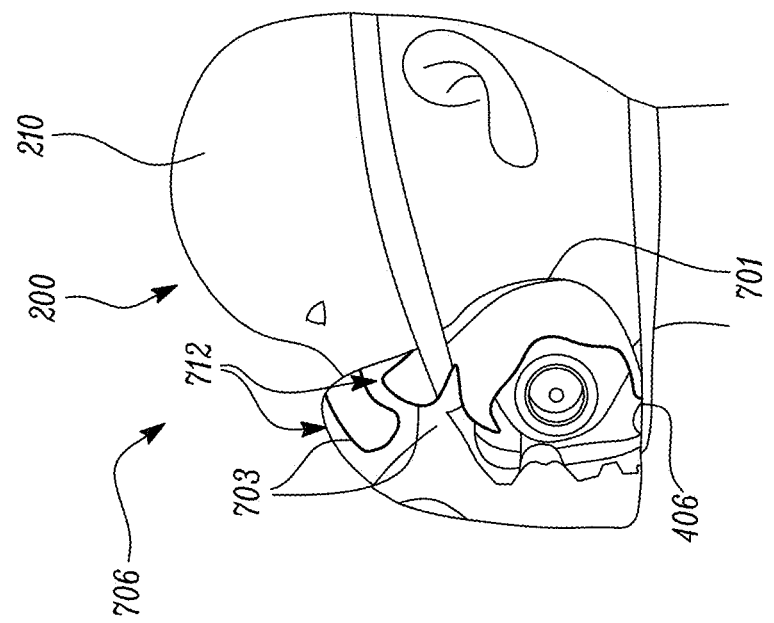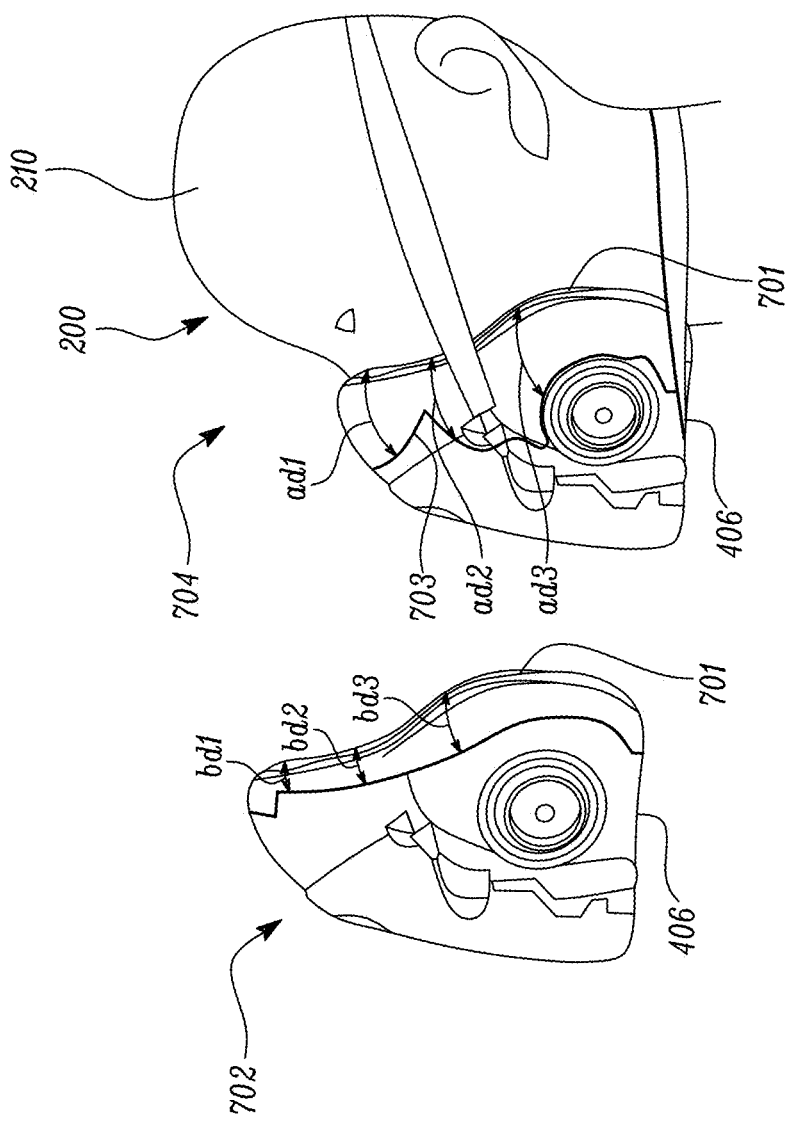
FIG. 7A  FIG. 7B  FIG. 7C

SYSTEM AND METHOD FOR DETERMINING PERSONAL PROTECTIVE EQUIPMENT COMFORT

TECHNICAL FIELD

The present disclosure relates generally to a personal protective equipment (PPE), and in particular, to a system and a method for determining PPE comfort for an individual wearer.

BACKGROUND

Personal protective equipment (PPE), such as respirators, are widely used for respiratory protection by users. In some applications, users may wear the PPE for several hours a day. A goal for the PPE is provision of efficient sealing without causing discomfort. A poor sealing and/or poor fit of the PPE may hamper an effectiveness of the PPE resulting in leakage and a possibility of contaminant inhalation, which is not desirable. Thus, a good PPE fit is important to ensure the user is well protected against gases and particulates.

In some cases, users may have to try different types and sizes of the PPE that provides efficient sealing as well as comfort, which may be time consuming. Further, in some situations, the users may not be able to judge whether a particular type and/or size of the PPE provides efficient sealing. Moreover, the users may not wear the PPE as intended, which may either cause inefficient sealing and/or discomfort. Further, the user may feel discomfort when the skin deforms due to applied pressure by the PPE.

Currently, there are no methods available that quantify the PPE comfort by addressing a discomfort factor. Some amount of pressure may be required for secure fitting of the PPE, however, any excess pressure may cause discomfort to the user. In some cases, high pressures may be felt by the users due to an inadequate design of the PPE. Conventional methods and systems to determine PPE fit and comfort typically use facial shape data of the users. There is a need for an improved system and method that allows determination of PPE comfort on different users that solves one or more of the aforementioned challenges.

SUMMARY

In a first aspect, the present disclosure provides a method for determining personal protective equipment (PPE) comfort for an individual wearer. The method includes defining a first anatomical shape data representative of an anatomical area of the individual wearer prior to donning a PPE. The method also includes defining a second anatomical shape data representative of the anatomical area of the individual wearer after donning the PPE. The method further includes comparing the first anatomical shape data with the second anatomical shape data. The method includes determining a soft skin tissue deformation at a plurality of predetermined anatomical positions based on the comparison between the first anatomical shape data and the second anatomical shape data. The method also includes determining a displacement comfort threshold ($CT_d$) value based on the soft skin tissue deformation at the plurality of predetermined anatomical positions. The method further includes determining a pressure pain threshold (PPT) value at the plurality of predetermined anatomical positions. The method further includes determining a comfort metric based on the PPT values and the $CT_d$ values. The method also includes generating a notification corresponding to the comfort metric.

In a second aspect, the present disclosure provides a system for determining PPE comfort for an individual wearer. The system includes a processor configured to define a first anatomical shape data representative of an anatomical area of the individual wearer prior to donning a PPE. The processor is also configured to define a second anatomical shape data representative of the anatomical area of the individual wearer after donning the PPE. The processor is further configured to compare the first anatomical shape data with the second anatomical shape data. The processor is configured to determine a soft skin tissue deformation at a plurality of predetermined anatomical positions based on the comparison between the first anatomical shape data and the second anatomical shape data. The processor is also configured to determine a $CT_d$ value based on the soft skin tissue deformation at the plurality of predetermined anatomical positions. The processor is further configured to determine a PPT value at the plurality of predetermined anatomical positions. The processor is further configured to determine a comfort metric based on the PPT values and the $CT_d$ values. The system also includes an output module communicably coupled with the processor. The output module is configured to provide a notification corresponding to the comfort metric received from the processor thereon.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

FIG. 7A is a scanned image of the PPE, according to an embodiment of the present disclosure;

FIGS. 7B and 7C are 3D scanned images of the face of the individual wearer after donning the PPE for indicating sealing characteristics of the PPE, according to an embodiment of the present disclosure;

DETAILED DESCRIPTION

Figure 1:
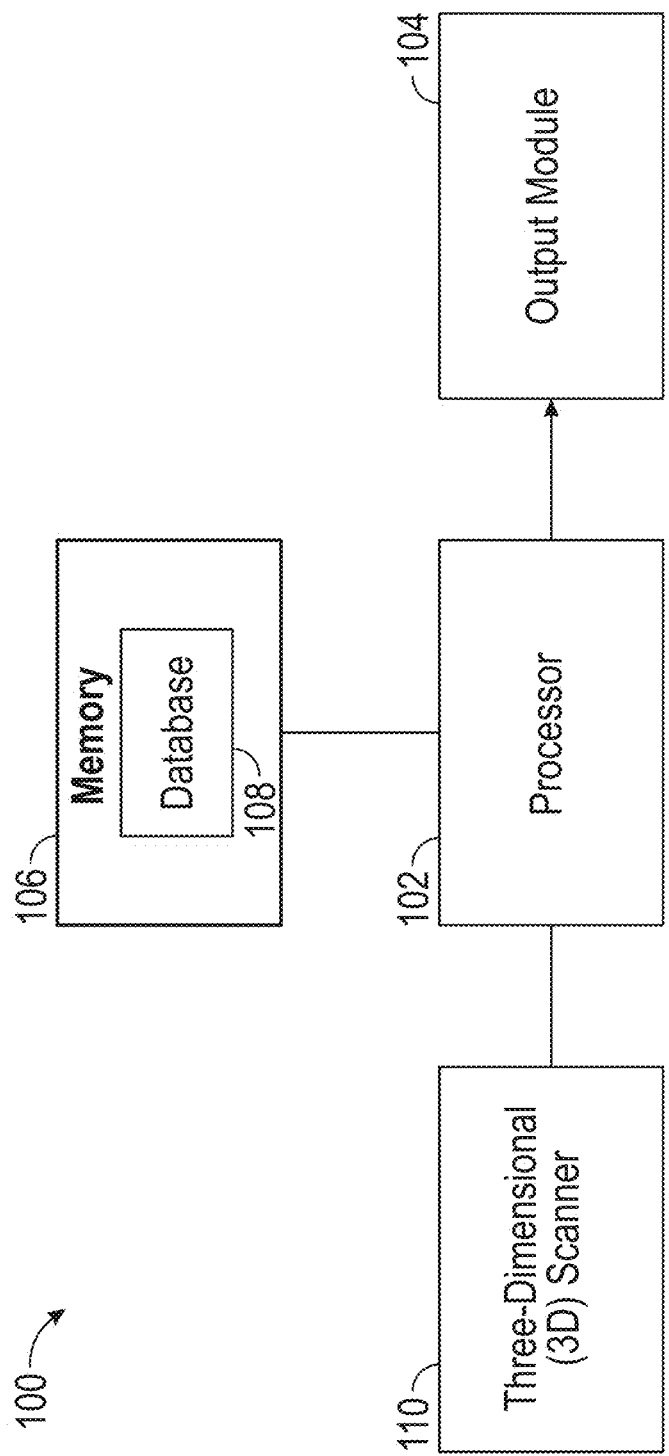
FIG. 1 is a block diagram of a system for determining personal protective equipment (PPE) comfort for an individual wearer, according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

Various types of personal protective equipment (PPE) are commonly worn by people who work in areas where air may be contaminated with toxic substances, such as, airborne particulates, gases, and vapors. A type of the PPE used in a particular environment depends on an amount of the toxic substances and type of protection required by an individual wearer. The PPE type used may also depend on factors, such as biomechanical properties, skin deformation on donning of the PPE, etc. of the individual wearer.

While selecting the PPE for the individual wearer, it is important to ensure that the PPE is comfortable to wear and provides efficient sealing so that the individual wearer is well protected against gases and particulates. Conventional PPE selection methods do not consider biomechanical properties of an individual wearer's face, or in other words, response of the individual wearer's face upon application of a force. Thus, the PPE selected using conventional techniques may not be comfortable for the user.

The present disclosure relates to a system and a method of assessing PPE comfort for the individual wearer by addressing the biomechanical properties of the face of the individual wearer. The system disclosed herein includes a processor that is configured to determine a comfort metric of the PPE as well as a sealing of the PPE using anatomical shape data of the individual wearer before and after donning the PPE. By determining the comfort metric, skin pressure comfort for the PPE may be quantified which ultimately allows product comparison, design evaluation and development, claims verification, and customer education. The disclosed system may help to quantify the PPE comfort and develop PPE products that provide improved comfort. The system also considers biological properties of the face of the individual wearer to select an appropriate PPE for a particular individual wearer. As the PPE selection is based on determination of the comfort metric, the individual wearer may feel comfortable and confident with the selected configuration of the PPE. The comfort metric determination also considers factors, such as skin deformation due to pressure applied by the PPE, to evaluate an appropriate PPE that fits well to the individual wearer. More particularly, the system and the method described in the present disclosure allows determination of pressure distribution of the PPE on the user's skin, which may in turn allow improvement in PPE design and prevent excessive pressure points on the user's skin.

As skin deformation or skin displacement is an important factor that is considered while selecting the PPE for the individual wearer, the disclosure describes a method to quantify skin pressure comfort for different PPE types and sizes. The system and method consider the skin pressure discomfort due to combined effects of applied pressure and PPE design. Hence, by measuring skin deformations due to the PPE design and pressure applied by the PPE, various adjustments or modifications may be applied to select a comfortable PPE for the individual wearer. Further, the comfort metric value also gives an indication about sealing effectiveness provided by the PPE which may in turn help the individual wearer to choose a PPE that exhibits an improved sealing and is comfortable to wear.

Referring now to FIG. 1, a system 100 for determining PPE comfort for the individual wearer is illustrated. The system 100 includes a processor 102, an output module 104, and a memory 106. The processor 102 may be a programmable analog and/or digital device that can store, retrieve, and process data. In an application, the processor 102 may be a controller, a control circuit, a computer, a workstation, a microprocessor, a microcomputer, a central processing unit, a server, or any suitable device or apparatus. Some examples may also include input devices (not shown) connected to the processor 102.

The output module 104 is communicably coupled with the processor 102. The output module 104 may be a display panel, a printer, a speaker, a monitor, a plotter, a graphic output device, or any electronic device with a user interface. The output module 104 may be present with the individual wearer, a PPE selector, a PPE designer, a PPE manufacturer, a control module, and the like. The memory 106 includes a database 108. The database 108 may have a data structure to store organized information and data. The memory 106 may also include a suitable combination of computing devices and software modules for storing, manipulating, and retrieving data records related to different types of PPE 406 (shown in FIG. 4B) and the individual wearers. The system 100 further includes at least one Three-Dimensional (3D) scanner 110 communicably coupled with the processor 102.

Figure 2B:
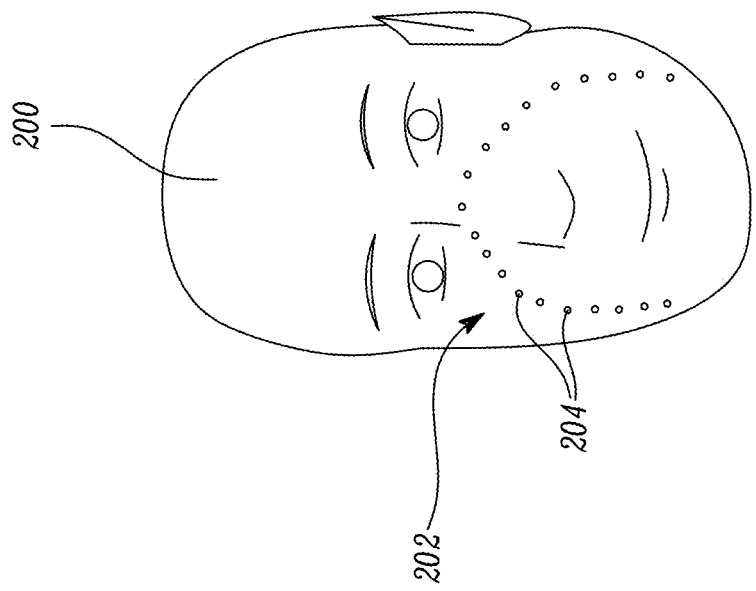
FIGS. 2A and 2B illustrate an exemplary face of the individual wearer on which the PPE will be donned, according to an embodiment of the present disclosure.
Figure 2A:
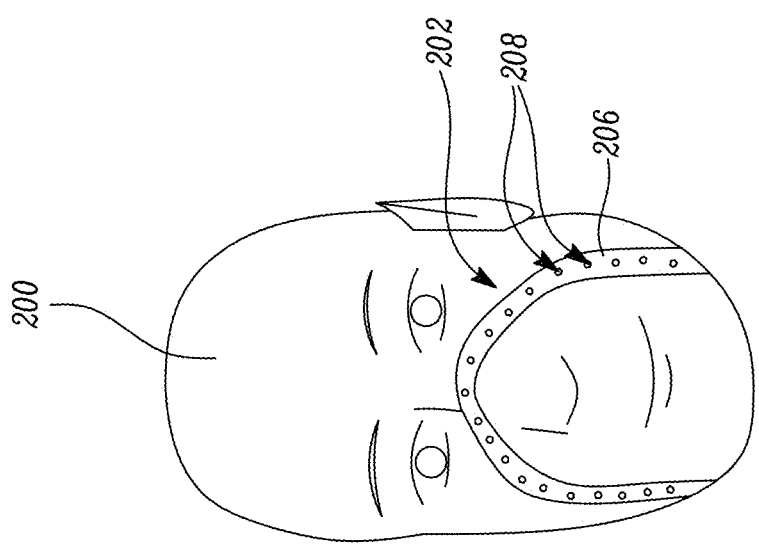

Further, the present disclosure utilizes biomechanical properties of the individual wearer to determine PPE comfort and PPE sealing. A first technique of determining one or more biomechanical properties of the individual wearer will now be explained in conjunction with FIGS. 2A and 2B. As shown in FIGS. 2A and 2B, while determining the PPE comfort for the individual wearer, the processor 102 (see FIG. 1) determines one or more biomechanical properties of a face 200 of the individual wearer, according to an embodiment of the present disclosure. The biomechanical properties of the face 200 may include a response of the face 200 on application of an external force, for example, after donning the PPE 406 (shown in FIG. 4B). To determine the biomechanical properties of the face 200, a zone 202 is quantified where the PPE 406 would contact the face 200. The zone 202 is quantified by placing a gasket 206 (shown in FIG. 2A) having a number of holes 208 (shown in FIG. 2A) over the face 200. The gasket 206 may embody a 3D printed gasket. Further, a number of data points 204 (shown in FIG. 2B) are marked on the face 200 with a marker (not shown).

After marking the zone 202 with the data points 204, measuring devices (not shown) may be used for measuring pressure and displacement values at each data point 204. For example, a pressure sensor and a caliper may be used to determine pressure and displacement values at each data point 204. In some examples, a hardware, such as Arduino or any other hardware, may be used to capture data corresponding to the pressure and the displacement values at the data points 204. Further, the face 200 may be digitized with a depth camera to link shape models with pressure/displacement models.

Figure 3:
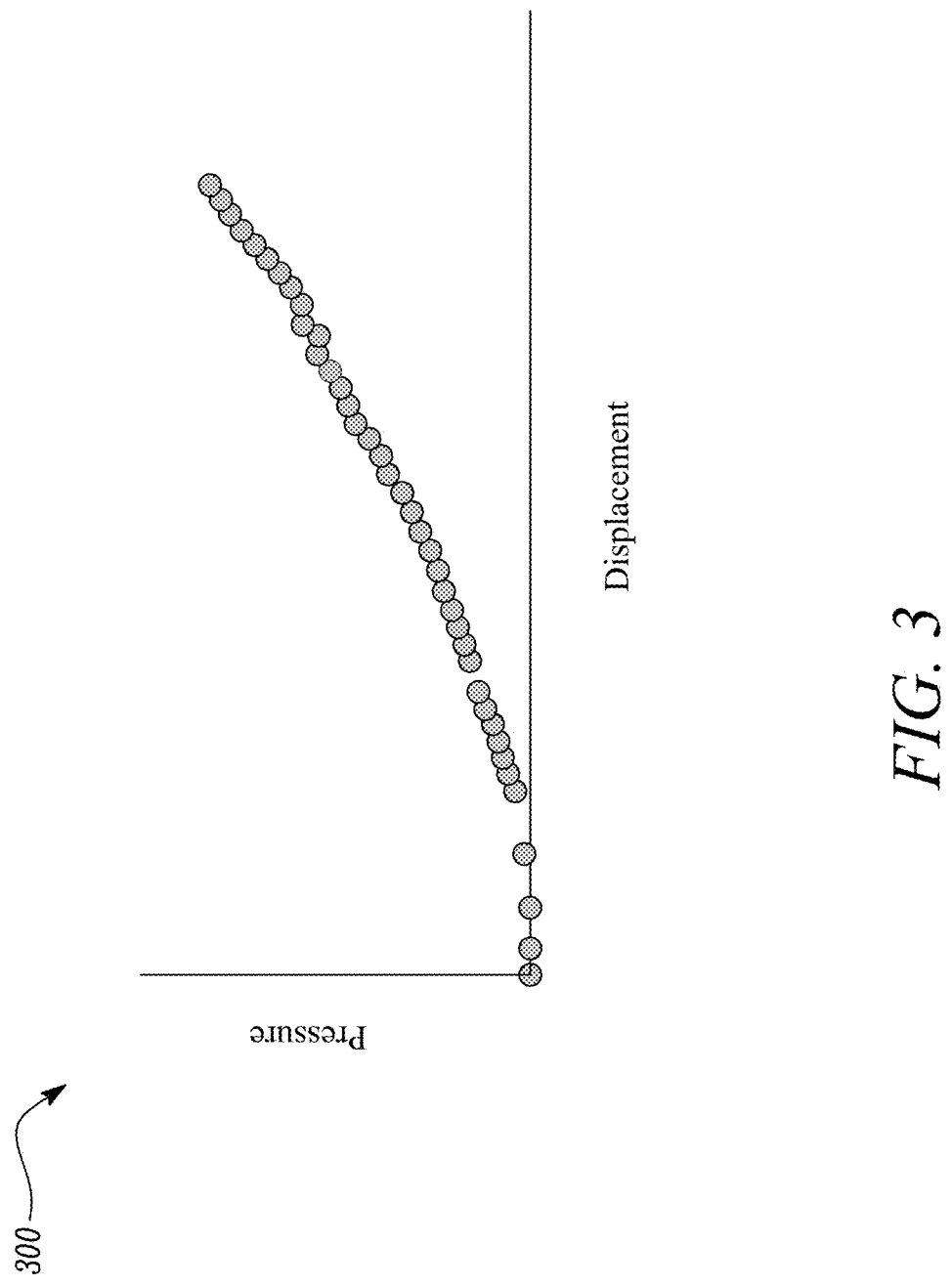
FIG. 3 is an exemplary graph illustrating a pressure displacement curve characterizing biomechanical properties of the face of the individual wearer.

Moreover, the pressure and the displacement values at the data points 204 may be used to generate pressure-displacement curves by the processor 102 to characterize the biomechanical properties of the face 200. Specifically, pressure and displacement caused due to donning of the PPE 406 are measured at each data point 204 to prepare a pressure-displacement curve. An exemplary pressure-displacement curve 300 is shown in FIG. 3. As illustrated in FIG. 3, with increase in the pressure on the face 200 (see FIGS. 2A and 2B), a displacement or deformation of the skin also increases in a substantially linear trend.

Further, the processor 102 (see FIG. 1) may generate a new vector (x, y, z, d, p) for each data point 204 (see FIGS. 2A and 2B) in a 3D space (x, y, z), a displacement vector (d), and a pressure vector (p). As the data is collected for population statistics, pressure-displacement curves 300 are generated for a number of samples, which may enhance accuracy of data collection. In some embodiments, the pressure-displacement curves 300 may be resampled at regular predefined pressure intervals, such that a precise data acquisition could be established. The resampling may be interpolated to ensure that the resampled data is following underlying pressure-displacement curve trends. In some embodiments, the processor 102 may be used to conduct a bicubic interpolation. In another embodiment, linear interpolation may be used, such as in examples where data is acquired at a high sample rate.

Once the new vectors (x, y, z, d, p) are generated, resampled, and interpolated, preprocessing of the results may be performed to format pressure and displacement values. In other words, pressure values may be normalized against the maximum pressure, and the displacement values may be normalized against the maximum displacement.

Further, a feature vector for faces of multiple wearers may be constructed based on normalized measurements or values of pressure and displacement. The feature vector for each face may be depicted as:

$(x_1, y_1, z_1, x_2, y_2, z_2, \ldots, x_n, y_n, z_n, d_1, p_1, d_2, p_2, \ldots, d_m, p_m)$ Further, the processor 102 is configured to use statistical shape modeling tools and principal component analysis to create a low dimensional representation of the feature vector data for each face. This approach may allow easier interpretation and summarizing of data using fewer parameters. Therefore, by using biomechanical properties or the pressure-displacement curves 300, population statistics data, and statistical shape modeling tools, the processor 102 may determine comfort fit of the PPE 406 for one or more individual wearers. Utilization of biomechanical properties to predict the comfort fit of the PPE 406 for the individual wearer may help to customize the PPE 406 for the individual wearer. Thus, the details described in relation to FIGS. 2A to 3 may assist in selection of the PPE 406 for the individual wearer.

Further, the processor 102 is configured to define a first anatomical shape data representative of an anatomical area of the individual wearer prior to donning the PPE 406. The processor 102 are also configured to define a second anatomical shape data representative of the anatomical area of the individual wearer after donning the PPE 406. Furthermore, the first anatomical shape data and the second anatomical shape data is defined based on scanning the anatomical area of the individual wearer prior to donning the PPE 406 and after donning the PPE 406, respectively, using the 3D scanner 110 (shown in FIG. 1).

Figure 4B:
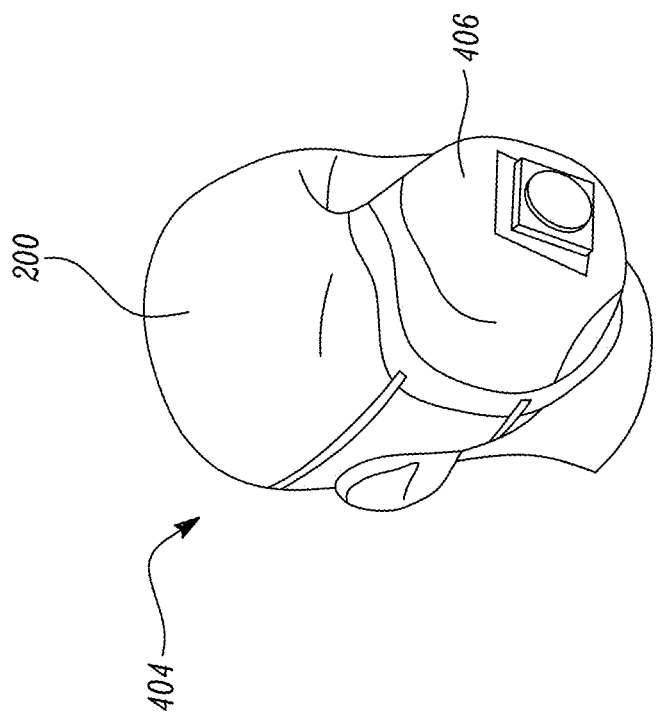
FIG. 4B is a 3D facial scan of the individual wearer after donning the PPE, according to an embodiment of the present disclosure.
Figure 4A:
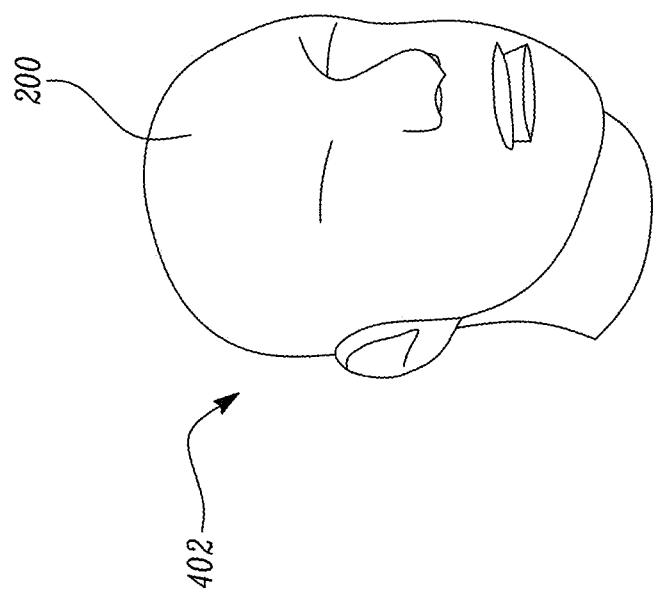
FIG. 4A is a Three-Dimensional (3D) facial scan of the individual wearer prior to donning the PPE, according to an embodiment of the present disclosure.

FIG. 4A illustrates a 3D facial scan 402 of the individual wearer prior to donning the PPE 406 and FIG. 4B illustrates a 3D facial scan 404 of the individual wearer after donning the PPE 406. The 3D facial scans 402, 404 may be performed by the 3D scanner 110 (see FIG. 1). The processor 102 (see FIG. 1) may communicate with the 3D scanner 110 for obtaining the 3D facial scans 402, 404 therefrom. The 3D scanner 110 may pick up small features in a range of 0.15 millimeters (mm) with a resolution of 50 micrometers (μm). In some embodiments, the 3D scanner 110 may include a structured light scanner from Artec 3D. For example, Artec Eva may be used for coarse resolution scanning, whereas more finer details may be captured by Artec Spider. The 3D facial scans 402, 404 may be processed by the processor 102 using a software, such as Artec Studio 12 Professional.

Further, the processor 102 processes the 3D facial scan 402 to define the first anatomical shape data representative of the anatomical area of the individual wearer prior to donning the PPE 406. Similarly, the processor 102 processes the 3D facial scan 404 to define the second anatomical shape data representative of the anatomical area of the individual wearer after donning the PPE 406.

Figure 4D:
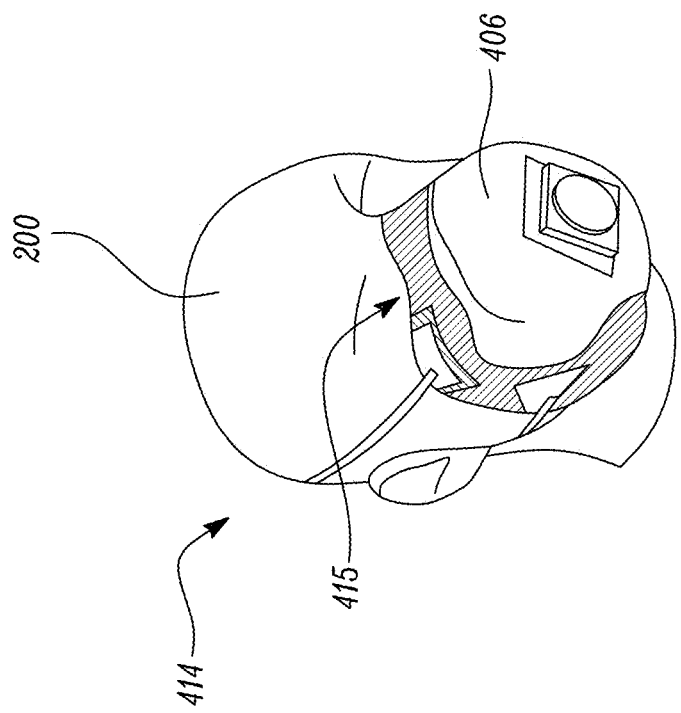
FIG. 4D illustrates skin deformation regions in the composite image of FIG. 4C, according to an embodiment of the present disclosure.
Figure 4C:
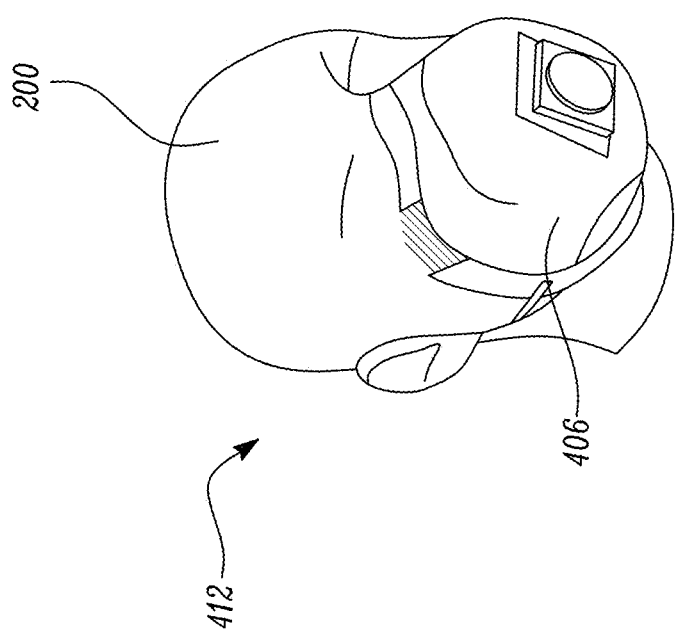
FIG. 4C is a composite image of the individual wearer obtained by superimposing the 3D facial scans of FIGS. 4A and 4B, according to an embodiment of the present disclosure.

Moreover, the processor 102 is configured to superimpose the processed 3D facial scans 402, 404 to generate a composite image 412, as shown in FIG. 4C. In other words, the processor 102 is configured to compare the first anatomical shape data with the second anatomical shape data to generate the composite image 412. Further, the processor 102 may analyze the composite image 412 to determine regions on the face 200 that are subjected to soft skin tissue deformation "u" after donning the PPE 406. More particularly, FIG. 4D illustrates a facial image 414 indicating a skin deformation region 415 on the face 200 after donning the PPE 406. The skin deformation region 415 is shown using a hatched section in FIG. 4D.

Figure 5:
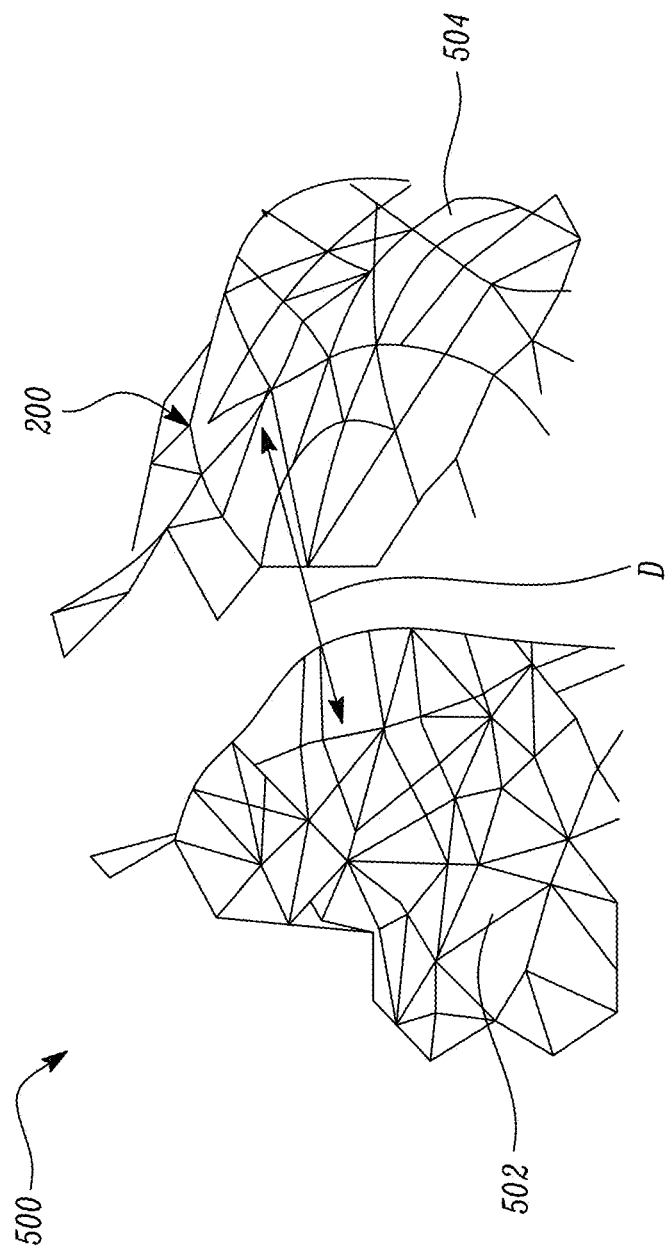
FIG. 5 is a 3D image indicating soft skin tissue deformation of the face of the individual wearer, according to an embodiment of the present disclosure.

The processor 102 is also configured to determine the soft skin tissue deformation "u" at a plurality of predetermined anatomical positions based on the comparison between the first anatomical shape data and the second anatomical shape data. The processor 102 is configured to generate the plurality of the predetermined anatomical positions based on at least two dynamic movements performed by the individual wearer. FIG. 5 shows a 3D scanned image 500 for investigation of the skin deformation region 415 in the facial image 414 of FIG. 4D. The scanned image 500 includes an undeformed surface 502 on the face 200 prior to donning the PPE 406. The scanned image 500 also includes a deformed surface 504 on the face 200 after donning the PPE 406. Further, a distance "D" is defined between the undeformed and deformed surfaces 502, 504. The distance "D" reflects an amount of the soft skin tissue deformation "u" on the face 200 after donning the PPE 406. Such an investigation of the soft skin tissue deformation "u" using scanned images may be considered equivalent to measuring the deformation directly on the skin.

Figure 6B:
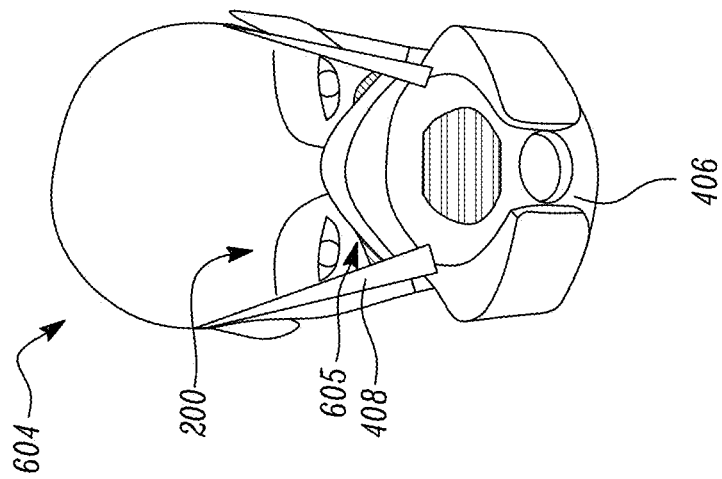
FIGS. 6A to 6C illustrate 3D facial scans of the individual wearer after donning the PPE indicating skin deformation regions corresponding to varying pressures applied by the PPE, according to an embodiment of the present disclosure.
Figure 6A:
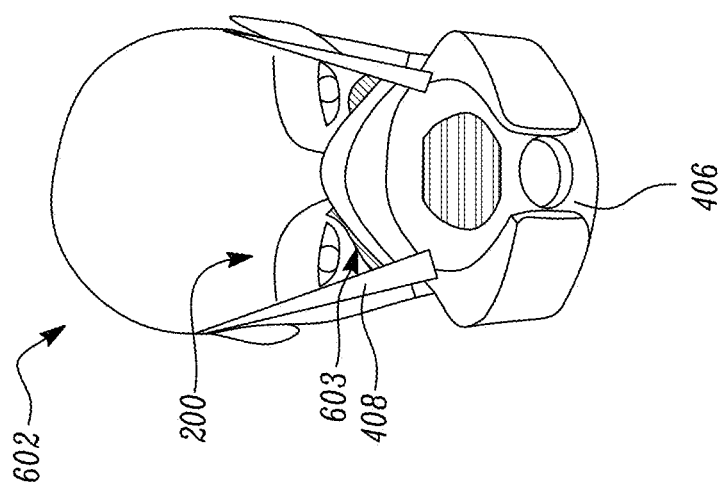
Figure 6D:
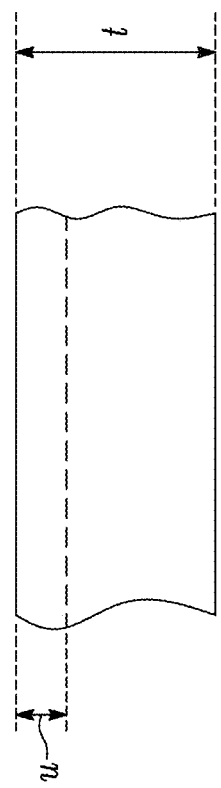
FIG. 6D is a schematic view of a soft skin tissue deformation in a skin tissue having a soft skin tissue thickness, according to an embodiment of the present disclosure.
Figure 6C:
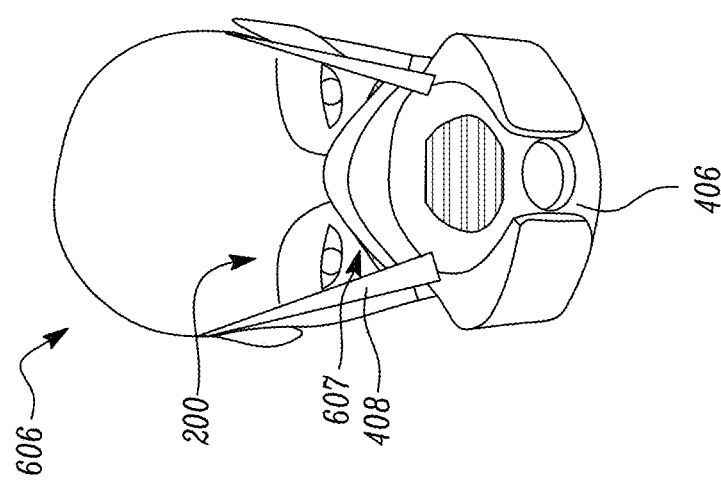

In an embodiment with reference to FIGS. 6A to 6C, the processor 102 may receive 3D facial scans 602, 604, 606 of the individual wearer after donning the PPE 406 from the 3D scanner 110 (see FIG. 1). FIG. 6D schematically shows the soft skin tissue deformation "u" of the individual wearer. The PPE 406 (see FIGS. 6A to 6C) includes a strap 408 by which the PPE 406 can be adjusted as per requirements. Referring to FIG. 6A, the 3D facial scan 602 is illustrated in which a high pressure is applied by the PPE 406 or the strap 408, which is in line with an expected outcome of tightening the strap 408. The high pressure applied by the PPE 406 in FIG. 6A generates a high skin deformation region 603 illustrated by a hatched section herein.

Referring to FIG. 6B, the 3D facial scan 604 is illustrated in which a medium pressure is applied by the PPE 406 or the strap 408. The medium pressure applied by the PPE 406 in FIG. 6B generates a medium skin deformation region 605 illustrated by a hatched section herein. Referring now to FIG. 6C, the 3D facial scan 606 is illustrated in which a low pressure is applied by the PPE 406 or the strap 408. The low pressure applied by the PPE 406 in FIG. 6C generates a low skin deformation region 607 illustrated by a hatched section herein.

Therefore, with reference to the high, medium, and low skin deformation regions 603, 605, 607 in FIGS. 6A, 6B, and 6C, respectively, it is evident that the amount of the soft skin tissue deformation "u" increases with an increase in the strap pressure or a PPE pressure. In other words, a magnitude of the soft skin tissue deformation "u" is proportional to the pressure applied by the PPE 406.

FIG. 6D shows the soft skin tissue deformation "u" in a skin tissue having a soft skin tissue thickness "t". With continued reference to FIGS. 6A to 6D, the soft skin tissue deformation "u" in the skin deformation regions 603, 605, 607 also depends on the soft skin tissue thickness "t" at the corresponding skin deformation regions 603, 605, 607. Further, in an example, the soft skin tissue thickness "t" can be measured by using an ultrasound equipment (not shown) such as Episcan (LONGPORT, INC, 1620 Baltimore Pike, P.O. Box 768, Chadds Ford, PA 19317). In some cases, approximate values can be determined from the database 108 (see FIG. 1) for the soft tissue thickness "t" for various population groups. In an example, a low soft skin tissue deformation "u" in the skin deformation region 607 may result from a low soft skin tissue thickness "t". Thus, any deformations under constant force may appear as smaller deformations than in thicker skin tissue regions.

The processor 102, while determining the soft skin tissue deformation "u" in a particular region, may consider the soft skin tissue thickness "t" for the same region. The processor 102 is configured to determine the soft skin tissue thickness "t" at the plurality of predetermined anatomical positions. More particularly, the processor 102 determines distribution of the soft skin tissue thickness "t" across the skin deformation regions 603, 605, 607. Further, the soft skin tissue thickness "t" is utilized to normalize deformation distribution. In an example, the processor 102 is configured to retrieve stored data for the soft skin tissue thickness "t" at the plurality of predetermined anatomical positions based on at least one of a previous assessment of the individual wearer and an aggregated data from a plurality of previous wearers. In another example, the soft skin tissue thickness "t" may be stored in the database 108. Accordingly, the processor 102 is configured to receive the soft skin tissue thickness "t" at the predetermined anatomical positions from the previously created database 108. In some embodiments, the plurality of predetermined anatomical positions are generated using a static modeling module. In an example, the static modeling module may include determining the predetermined anatomical positions by quantifying the zone 202 (see FIGS. 2A and 2B) using the gasket 206 (see FIG. 2A) and marking the data points 204 (see FIG. 2B) with the marker. In another example, the static modeling module may include determining the predetermined anatomical positions by scanning the anatomical area of the individual wearer prior to donning the PPE 406 and after donning the PPE 406 using the 3D scanner 110. The 3D facial scans 402, 404 (see FIGS. 4A and 4B) may be superimposed and analyzed to generate the composite and facial images 412, 414 (see FIGS. 4C and 4D) to indicate the predetermined anatomical positions.

In other embodiments, the plurality of predetermined anatomical positions are generated using a dynamic modeling module. In the dynamic modeling module, actual facial movement of the individual wearer may also be considered. The dynamic modeling module may also consider a simulated facial movement in order to evaluate the predetermined anatomical positions.

In some examples, the processor 102 is configured to correlate the soft skin tissue deformation "u" at the plurality of predetermined anatomical positions for each individual wearer and the pressure applied by the PPE 406 at the plurality of predetermined anatomical positions for each individual wearer. The processor 102 is further configured to aggregate the correlation for generating a predicted wearer comfort metric ($CM_{PRE}$).

In an example, a discomfort factor due to a design of the PPE 406 and the applied pressure from the PPE 406 may be considered as a function of the amount of the soft skin tissue deformation "u" produced relative to the overall soft skin tissue thickness "t". The ratio between the soft skin tissue deformation "u" and the soft skin tissue thickness "t" at the predetermined anatomical positions is defined as a first ratio "u/t".

Based on determination of the soft skin tissue deformation "u" and the soft skin tissue thickness "t", the processor 102 is configured to compute an initial comfort metric. The initial comfort metric may be defined as the ratio of the soft skin tissue deformation "u" to the soft skin tissue thickness "t", which is normalized by an overall relative skin displacement comfort threshold ($CT_d$) value. The processor 102 is configured to determine the $CT_d$ value based on the soft skin tissue deformation "u" at the plurality of predetermined anatomical positions. The $CT_d$ value is determined by changing the relative soft skin tissue deformation levels under the PPE 406 and using inputs from the individual wearer for gauging a pressure being perceived by the individual wearer and whether the deformations are comfortable for the individual wearer. The initial comfort metric may be determined using following Equation 1:

$$CM = \frac{1}{CT_d} \frac{u}{t} \quad \text{Equation 1}$$

To determine a generalized value of the initial comfort metric of Equation 1, the processor 102 determines the soft skin tissue thickness "t" for various anatomical positions on the face 200. As the soft skin tissue thickness "t" may vary across the area covered by the PPE 406, the processor 102 may take into consideration different values for the soft skin tissue thickness "t" across the face 200 covered by the PPE 406. In order to compare distribution of the soft skin tissue thicknesses "t" among different individual wearers, the processor 102 may determine the soft skin tissue thickness "t" at the various anatomical positions on the face 200 proximate to a location where the PPE 406 is worn. The determined soft skin tissue deformations "u" around the anatomical positions may be divided by the soft skin tissue thickness "t" and summed together. Specifically, the processor 102 is configured to determine the first ratio "u/t" between the determined soft skin tissue deformation "u" and the soft skin tissue thickness "t" at the plurality of predetermined anatomical positions. The first ratio "u/t" is then summed together for the predetermined anatomical positions, and normalized by the overall $CT_d$ value, to determine a comfort metric (CM). The processor 102 may be configured to determine a value of the CM by using following Equation 2:

$$CM = \frac{1}{CT_d \cdot N}\left[\frac{u_1}{t_1} + \frac{u_2}{t_2} + \frac{u_3}{t_3} \ldots + \frac{u_n}{t_n}\right] \quad \text{Equation 2}$$

where, $CT_d$ value is skin displacement comfort threshold value of the PPE 406 for all trials and wearers;

$u_1$ to un are determined soft skin tissue deformations; and $t_1$ to $t_n$ are soft skin tissue thicknesses at various predetermined anatomical positions.

To make the determined CM furthermore accurate, the processor 102 may consider variability in neurological pressure response at each of the anatomical positions for each wearer. For this purpose, the first ratio "u/t" can be multiplied by a pressure pain threshold (PPT) value. The PPT value may be defined as a minimum force applied on the face 200 of the individual wearer which induces pain and can be measured by using an algometer. Specifically, the processor 102 is configured to determine the PPT value at the plurality of predetermined anatomical positions. Therefore, an individual wearer comfort metric (CMP) is determined based on the PPT values, the $CT_d$ values, and the first ratio "u/t". The CMP may be hereinafter interchangeably referred to as "comfort metric". The processor 102 is configured to determine the individual wearer comfort metric CMP based on the PPT values, the $CT_d$ values, and the first ratio "u/t". Following Equation 3 may be used to determine a value of the CMP:

$$CMP = \frac{1}{CT_d \cdot NPPT}\left[PPT_1\frac{u_1}{t_1} + PPT_2\frac{u_2}{t_2} + PPT_3\frac{u_3}{t_3} \ldots + PPT_n\frac{u_n}{t_n}\right] \quad \text{Equation 3}$$

where, $PPT_i$ are the PPT values at each of the predetermined anatomical positions and, $$PPT = \sum_{i=1}^{N} PPT_i$$

Based on determination of the CMP using Equation 3, the output module 104 (see FIG. 1) is configured to provide a notification corresponding to the CMP received from the processor 102. Further, the notification corresponding to the CMP may be provided to the individual wearer, the PPE selector, the PPE designer/manufacturer, and/or the control station. In some embodiments, the output module 104 may generate a visual notification of a value of the CMP on a display panel. In some embodiments, the output module 104 may generate an audible signal to notify the value of the CMP by using a speaker. In yet other embodiments, the output module 104 may generate a printed report summary of the CMP.

Moreover, the processor 102 is also configured to compare the CMP to the $CM_{PRE}$. The calculation of the CMP acts as a factor to quantify the PPE comfort for one or more individual wearers. The CMP also takes into consideration the pressure distribution of the PPE 406 on the face 200 of the individual wearer, and the soft skin tissue thickness "t" of the face 200 of the individual wearer under the PPE 406. Determination of such values and using the same in the calculation of the CMP may help to choose an acceptable PPE 406 for the individual wearer.

In an example, a quality of fit can also be determined for an earmuff donned by the individual wearer. Donning the earmuff may also cause the soft skin tissue deformation "u" around an ear or in vicinity of the ear. Similarly, as described with reference to FIGS. 6A to 6C, the soft skin tissue deformation "u" can also be observed and determined for the earmuff. Therefore, regions of low, medium, and high skin deformations can be determined on the individual wearer. The regions with low or negligible soft skin tissue deformation "u" may indicate higher chances of a poor sealing which translates to inadequate protection for the individual wearer. Such regions are areas of potential concern which may be informed to the individual wearer, the PPE selector, the PPE designer/manufacturer, and/or the control station to make targeted adjustments to improve sealing quality of the earmuff.

Further, it should be noted that the regions of a low soft skin tissue deformation "u" after donning the earmuff may result from the low soft skin tissue thickness "t", so that any soft skin tissue deformation "u" under a constant force would appear as a small soft skin tissue deformation "u" than in thicker skin regions. Thus, a comfort metric can also be determined for a particular earmuff donned by the individual wearer, by following Equation 3, and entering the various values determined with respect to the earmuff. In another example, a similar approach may be applied on headbands to determine the quality of fit of the headbands for the individual wearer.

Figure 7E:
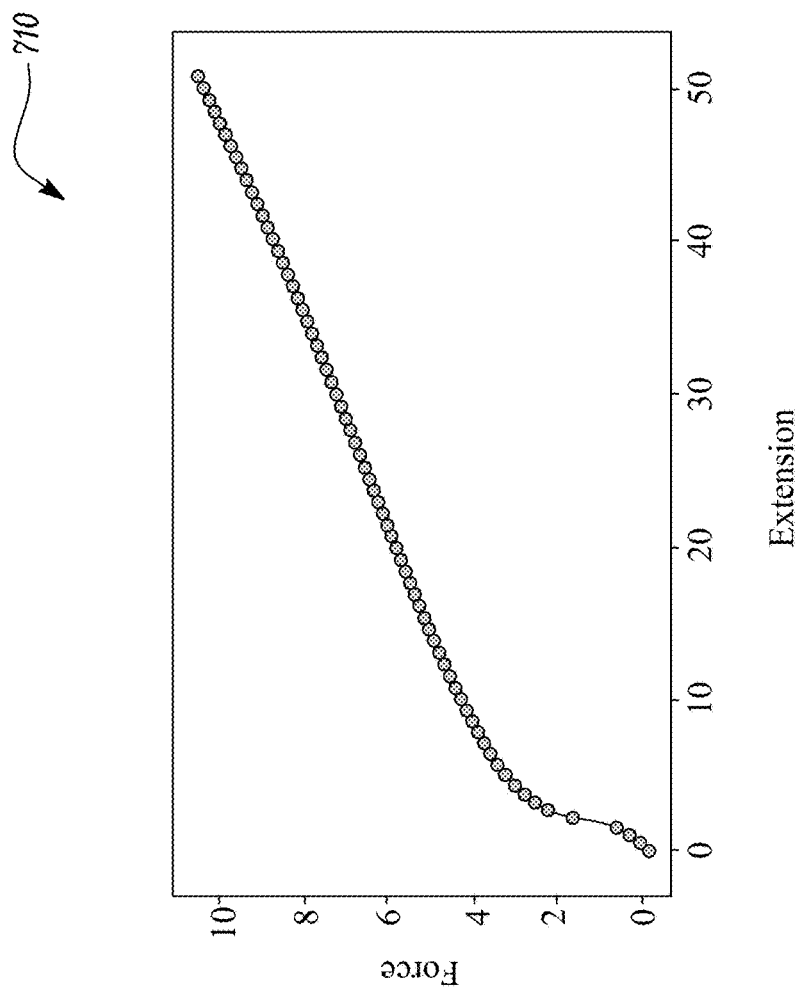
FIG. 7E is an exemplary graph illustrating a force extension curve characterizing tension on the PPE strap of the PPE of FIG. 7D, according to an embodiment of the present disclosure.

In an embodiment illustrated in FIGS. 7A to 7C, another factor that is considered in selecting the PPE 406 for a particular wearer is a sealing effectiveness factor. A head 210 of the wearer is shown in FIGS. 7A to 7C. For determining a sealing effectiveness of the PPE 406 (see FIG. 4B), the processor 102 (see FIG. 1) is configured to use the 3D scanner 110 (see FIG. 1) to estimate whether the PPE 406 seals with the face 200 adequately to provide protection to the individual wearer. Based on the estimated sealing area, a qualitative prediction of a fit factor of the PPE 406 can be projected. In case of an improperly created seal, the processor 102 can also point out a location of ineffective seal and suggest the individual wearer, the PPE selector, the PPE designer/manufacturer, and/or the control station to make targeted adjustments to improve sealing quality at that location. The processor 102, therefore, can determine if a proper seal has been created after donning the PPE 406.

The sealing effectiveness of the PPE 406 on the individual wearer can be determined by calculating a ratio of a particle concentration outside the PPE 406 to a particle concentration inside the PPE 406 while the PPE 406 is worn by the individual wearer. Further, the processor 102 is configured to define a first PPE shape data before donning the PPE 406 by the individual wearer and a second PPE shape data after donning the PPE 406 by the individual wearer. More particularly, the processor 102 receives a scan of the PPE 406 of the individual wearer before donning the PPE 406 from the 3D scanner 110. The processor 102 is also configured to determine a first contour data of the PPE 406 based on the first PPE shape data.

FIG. 7A is a scanned image 702 illustrating the PPE 406 before donning the PPE 406 by the individual wearer. The scanned image 702 defines the first PPE shape data before donning the PPE 406 by the individual wearer. In an example, a thickness of the PPE 406 is determined at points of interest from the scanned image 702 of the PPE 406. More particularly, the entire PPE 406 is scanned and split into front side scans and back side scans. After creating two separate scans, the thickness of the PPE 406 is measured, and accordingly the first contour data is defined. The first contour data defines various thickness values. For example, the scanned image 702 illustrates first thickness values "bd1", "bd2", "bd3" of the PPE 406 at different points of interest. The first thickness values "bd1", "bd2", "bd3" may collectively represent the first contour data.

The processor 102 also receives a scan of the PPE 406 and the face 200 of the individual wearer after donning the PPE 406 from the 3D scanner 110. The processor 102 is configured to determine a second contour data of the PPE 406 based on the second PPE shape data. FIG. 7B is a scanned image 704 illustrating the PPE 406 and the face 200 after donning the PPE 406 by the individual wearer. The scanned image 704 defines the second PPE shape data after donning the PPE 406 by the individual wearer. The scanned image 704 illustrates second thickness values "ad1", "ad2", "ad3" at the different points of interest. The second thickness values "ad1", "ad2", "ad3" may collectively represent the second contour data. It should be noted that the second thickness values "ad1", "ad2", "ad3" of the scanned image 704 represent the distances between a first outer edge 701 of the PPE 406 and a second outer edge 703 of the face 200 without donning the PPE 406.

Further, the processor 102 is configured to compare the first contour data with the second contour data. More particularly, the processor 102 compares a position of the second outer edge 703 relative to the first outer edge 701 which may be indicative of the sealing of the PPE 406. For example, in FIG. 7B, after donning the PPE 406, the second thickness values "ad1", "ad2", "ad3" between the second outer edge 703 and the first outer edge 701 is greater than the corresponding first thickness values "bd1", "bd2", "bd3" (see FIG. 7A) before donning the PPE 406. For example, the second thickness value "ad1" is greater than the first thickness value "bd1", the second thickness value "ad2" is greater than the first thickness value "bd2", the second thickness value "ad3" is greater than the first thickness value "bd3", and so on. This implies that the sealing effectiveness factor is high, and the PPE 406 provides a good seal. In other words, since the second thickness values "ad1", "ad2", "ad3" representing the second contour data are greater than the first thickness values "bd1", "bd2", "bd3" representing the first contour data, a good seal is expected from the PPE 406. In some examples, the sealing effectiveness factor/fit factor may be measured using a PortaCount (8030, TSI) and ambient particles. The sealing effectiveness factors/fit factors may be measured with constant inhalation through the PPE 406 at 30 Liters Per Minute (LPM).

Figure 7D:
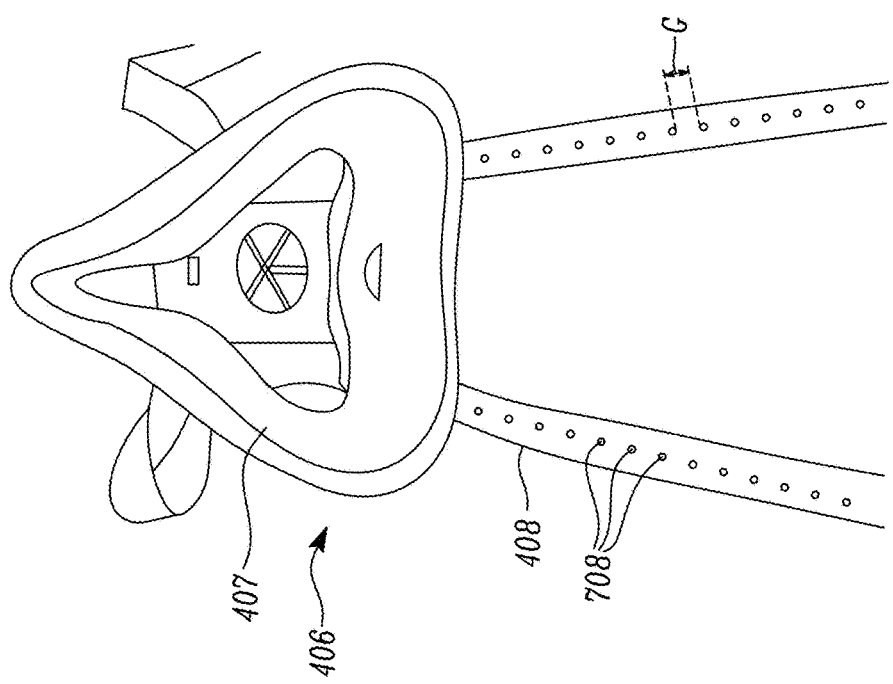
FIG. 7D illustrates a type of the PPE with markings on a strap of the PPE, according to an embodiment of the present disclosure.

On the other hand, for exemplary purpose, FIG. 7C illustrates a scanned image 706 in which the second outer edge 703 is comparatively closer to the first outer edge 701. Moreover, the second outer edge 703 includes multiple breaks. This phenomenon indicates that there are some areas where an inner edge 407 (shown in FIG. 7D) of the PPE 406 is not touching the face 200. Hence, the scanned image 706 depicts that there is a leak at a region 712 after the PPE 406 is donned by the individual wearer. This implies that the sealing effectiveness factor is low, and the PPE 406 is not providing a good seal.

The processor 102 is configured to generate a notification of the sealing effectiveness factor for the individual wearer based on the comparison between the first contour data and the second contour data. More particularly, the output module 104 (see FIG. 1), connected to the processor 102, is configured to provide the notification indicative of a fit or the sealing effectiveness factor of the PPE 406 on the individual wearer. The output module 104 may generate a visual notification or an audio notification. Further, the output module 104 may provide the notification corresponding to the sealing effectiveness factor to the individual wearer, the PPE designer/manufacturer, the PPE selector, and/or the control station. In some embodiments, the output module 104 includes a color-coded display for overlaying one or more colors indicative of the fit of the PPE 406. For example, a red color region may indicate a region of low sealing effectiveness factor, and a green color may indicate a region of high sealing effectiveness factor, and so on.

In addition to the PPE 406, the sealing effectiveness factor may also be determined for disposable respirators. A similar approach may be applied in case of the disposable respirators to guide the individual wearer to achieve a good fit. In an example, the sealing effectiveness factor may be determined for the disposable respirators at selected locations to highlight sealing quality at locations such as nose area, chin area, etc.

A data of a variety of different faces/heads and sealing effectiveness factors from a variety of different PPE choices can be stored in the database 108 (see FIG. 1). The processor 102, connected to the database 108, may therefore propose personalized PPE recommendations. The processor 102 may take a 3D scan of the face 200 of the individual wearer and calculate a similarity between the facial scan to previous facial scans from the database 108. Each previous facial scan in the database 108 can contain fields for a quality of a fit for different PPE designs. A consensus PPE option may then be generated by polling the most similar structural profiles to the wearer's measurements, and then computing a rank ordered list for PPE options that may be recommended based on their compliance likelihood. This type of rank ordering could be generated by a number of techniques, such as ranked choice voting amongst the most similar entries in the database 108 or a weighted scheme that incorporates the degree of similarity between the database entries and the wearer's face form (e.g., inverse distance-weighted voting). Certain recommendations can be pulled from the ranked list based on required PPE features for a given task, as certain PPEs 406 may fit well but may be unacceptable based on the exposure risks in an environment. Once the individual wearer finds a suitable fitting PPE 406, their face scan and PPE selection can be added to the database 108 to be used for future recommendations. The updated database 108 for this recommendation process may also benefit PPE designers and thus, enables the development of the PPE 406 that ideally conforms to structural archetypes from the database 108.

Further, according to another embodiment of the present disclosure, the processor 102 determines the first PPE shape data for a number of PPE sizes for a PPE type. The PPE sizes may include sizes, such as small, medium, large or the PPE sizes may be quantified using other parameters. It should be noted that the PPE type itself may include different models or designs of the PPE 406. The processor 102 may accordingly store the first PPE shape data for a number of PPE sizes in the database 108. Thus, the processor 102 can access information pertaining to the plurality of PPE sizes for the PPE type. It should be noted that the information pertaining to the PPE sizes may include first PPE shape data corresponding to the PPE type. Referring again to FIGS. 4A to 4C and FIG. 7D, the processor 102 (see FIG. 1) may determine where the inner edge 407 of the PPE 406 rests on the face 200. The processor 102 determines this position of the PPE 406 relative to the face 200 by comparing or superimposing, for the individual wearer, the first anatomical shape data with the second anatomical shape data. Then, the processor 102 predicts the PPE size for the individual wearer from the plurality of PPE sizes based on the comparison between the first anatomical shape data and the second anatomical shape data. It should be noted that the processor 102 predicts the PPE size based on the first anatomical shape data, the second anatomical shape data, and the information pertaining to the PPE sizes for the PPE type.

Further, the processor 102 is configured to generate a notification for the individual wearer pertaining to the predicted PPE size. Specifically, the notification is provided by the output module 104 (see FIG. 1). The output module 104 may provide the notification to the individual wearer, the PPE selector, the PPE designer/manufacturer, and/or the control station. In some embodiments, the output module 104, by using a display panel, may generate a visual notification for the predicted PPE size. In other embodiments, the output module 104, by using a speaker, may generate an audible alert to notify the information pertaining to the predicted PPE size. In yet other embodiments, the output module 104 may generate a printed report summary of the predicted PPE size for the individual wearer. Further, in some embodiments, the output module 104 may generate a notification for the individual wearer to change the PPE size from medium to large to maximize the PPE fit and comfort. In some embodiments, the output module 104 may generate a notification for the individual wearer to change the PPE size from large to medium to maximize the PPE fit and comfort.

Furthermore, in an alternate embodiment, the system 100 may include accessing information pertaining to a plurality of PPE types and a plurality of PPE sizes from a predetermined library. The predetermined library may embody the database 108 itself, or the predetermined library may be stored in the memory 106. Specifically, the processor 102 is configured to access information pertaining to the plurality of PPE types and PPE sizes from the predetermined library, to predict for the individual wearer, a PPE type from the plurality of PPE types and the PPE size from of the plurality of PPE sizes.

Further, the individual wearers generally try to adjust the PPE 406 by tightening or loosening the strap 408 to get a good fit. The individual wearers adjust the strap 408 in a range of different tensions while donning the PPE 406. Each tension may cause a different soft skin tissue deformation "u" and pressure on the face 200. Some individual wearers may tighten the strap 408 of the PPE 406 to a greater extent than other individual wearers. Most individual wearers find it difficult to assess an amount of tension in the strap 408 that is sufficient beyond their subjective impressions. Some individual wearers have also been observed to overtighten the strap 408 beyond a value that is required to get a good fit. The overtightening of the strap 408 may affect the comfort/wear tolerance of the individual wearer while donning the PPE 406.

In order to determine the tension in the strap 408, the processor 102 is configured to define a plurality of predetermined setting ranges for adjusting at least one adjustable feature on the PPE 406. In the illustrated example, the at least one adjustable feature includes strap tension. Alternatively, the at least one adjustable feature may include any other feature associated with the PPE 406. The predetermined setting ranges are defined based on at least one of a fit of the PPE 406 and a comfort of the PPE 406. The predetermined setting ranges may be defined as various ranges of tensions for the PPE 406 based on a size of the PPE 406. For example, the predetermined setting ranges may vary for a medium size PPE, a small size PPE, and so on.

In order to define the plurality of predetermined setting ranges, the strap 408 is marked with a number of first equidistant markings 708, where each first marking 708 is at a distance "G" from an adjacent first marking 708 when the strap 408 is slack. After the PPE 406 is donned by the individual wearer, the strap 408 is further marked with a number of second equidistant markings (not shown), where each second marking may again lie at a certain distance from an adjacent second marking. It is noted than the distance between two adjacent second markings is greater than the distance "G" between two adjacent first markings 708. The extended distance or extension between the two adjacent second markings is noted. Now referring to FIG. 7E, tension in the strap 408 when the PPE 406 is donned by the individual wearer, may be determined by plotting a force-extension curve 710 obtained on a tensile tester of the strap 408. The force-extension curve 710 may be used to determine different predetermined setting ranges. Such technique may in turn allow modifications in the strap 408 for current or other PPEs 406 to include markings that indicate an accurate way to wear the PPE 406 for achieving a sufficient fit without sacrificing comfort.

Once the processor 102 defines the predetermined setting ranges for adjusting one or more adjustable features on the PPE 406, the processor 102 is configured to notify the individual wearer of the predetermined setting range from the plurality of predetermined setting ranges for adjusting at least one adjustable feature. Specifically, the output module 104 may provide the notification to the individual wearer, the PPE selector, the PPE designer/manufacturer, and/or the control station. Further, the predetermined setting ranges may be marked on the strap 408 to notify the individual wearer regarding acceptable strap tension. Thus, the strap 408 may be modified in current or future PPE 406 to indicate different predetermined setting ranges. Such predetermined setting ranges may help the individual wearer to achieve a sufficient fit without sacrificing comfort. Therefore, the disclosed embodiment may be used to advise the individual wearer regarding the tightening of the strap 408 to get a good fit without causing discomfort. In some embodiments, such approach may be applied on a headband of the PPE 406. As per the embodiment, the processor 102 may adjust one or more adjustable features on the PPE 406 to a variety of predetermined settings in order to find an optimal balance of fit and comfort. Therefore, the processor 102 may predict a wearer adjustable setting value of a particular feature that would give the individual wearer a good fit while maintaining wearer comfort. Thus, the processor 102 may prevent the individual wearer to select a wearer adjustable setting which can be uncomfortable (e.g., by overtightening headbands or straps).

Figure 8:
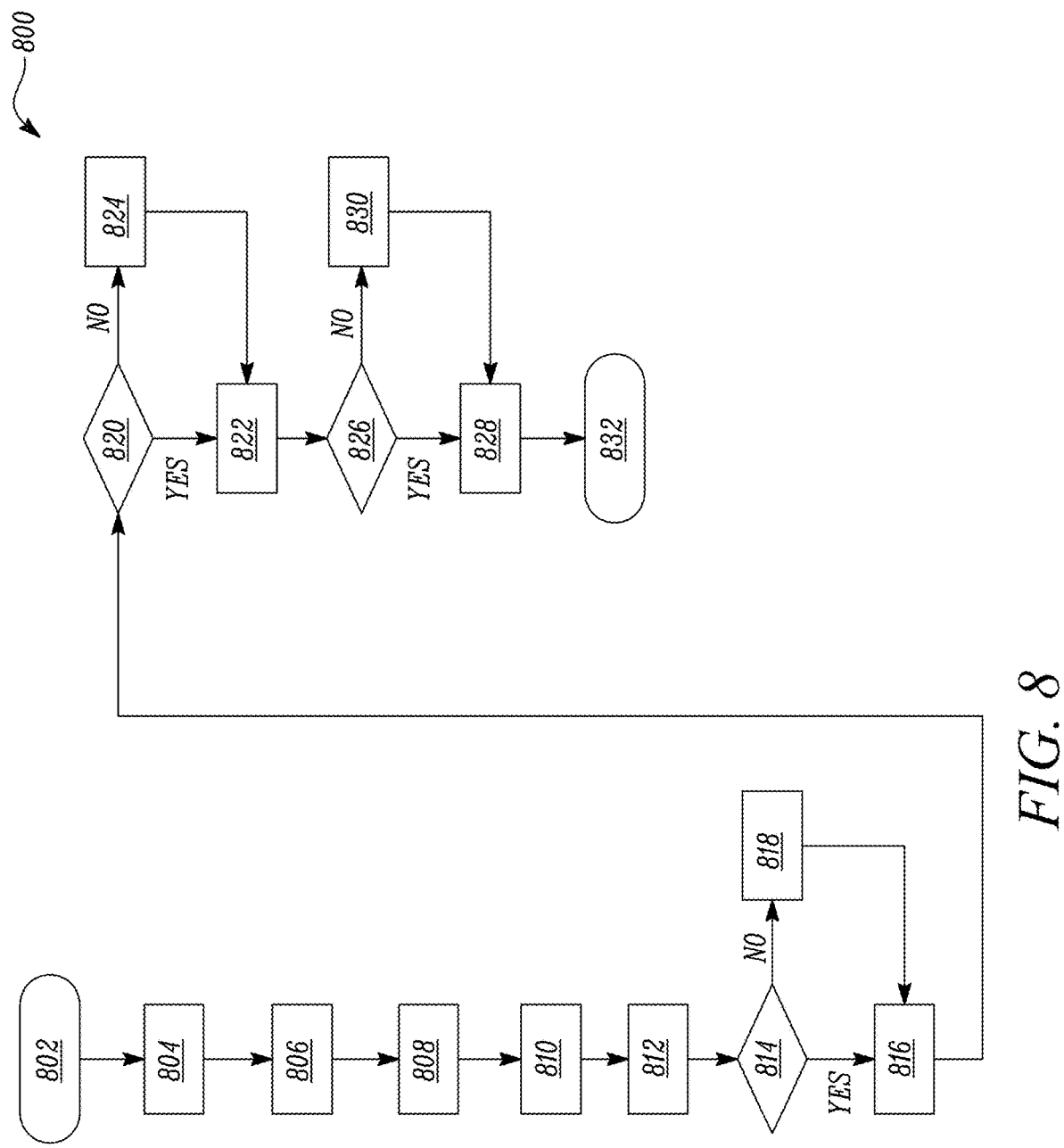
FIG. 8 illustrates a flowchart for a process for determining a sealing effectiveness factor of the PPE, according to an embodiment of the present disclosure.

Referring to FIG. 8, a flowchart for a process 800 for determining the CMP of the PPE 406 for the individual wearer is illustrated, in accordance with an embodiment of the disclosure. The process 800 is embodied as a logic/algorithm implemented by the processor 102 and may be stored in the memory 106 of the system 100.

At block 802, the process 800 is activated by the processor 102. More particularly, the process 800 starts or begins operation by selecting the PPE 406 for which the CMP is to be determined. The process 800 then moves to a block 804. At the block 804, the processor 102 receives the 3D facial scan 402 generated by the 3D scanner 110. The 3D facial scan 402 is the scan of the face 200 of the individual wearer prior to donning the PPE 406. The process 800 then moves to a block 806. At the block 806, the processor 102 processes the 3D facial scan 402 and stores the processed 3D facial scan 402 in the database 108. The processed 3D facial scan 402 defines the first anatomical shape data representative of the anatomical area of the individual wearer prior to donning the PPE 406. The process 800 then moves to a block 808. At the block 808, the processor 102 receives the 3D facial scan 404 generated by the 3D scanner 110. The 3D facial scan 404 is the scan of the face 200 of the individual wearer after donning the PPE 406.

The process 800 then moves to a block 810. At the block 810, the processor 102 processes the 3D facial scan 404 and stores the processed 3D facial scan 404 in the database 108. The processed 3D facial scan 404 defines the second anatomical shape data representative of the anatomical area of the individual wearer after donning the PPE 406. The process 800 further moves to a block 812. At the block 812, the processor 102 is configured to compare the processed 3D facial scans 402, 404. Specifically, the processor 102 aligns and superimposes the 3D facial scans 402, 404 to generate the composite image 412. Therefore, the processor 102 is configured to compare the first anatomical shape data with the second anatomical shape data. After generating the composite image 412, the processor 102 is configured to determine the soft skin tissue deformation "u" at the predetermined anatomical positions based on the comparison between the first anatomical shape data and the second anatomical shape data. The processor 102 primarily determines the skin deformation region 415 on the face 200 after the PPE 406 is donned by the individual wearer. Further, the processor 102 compares the undeformed and the deformed surfaces 502, 504 with each other to determine the amount of soft skin tissue deformation "u" after donning the PPE 406. Similarly, the processor 102 may also determine the soft skin tissue deformation "u" in the skin deformation regions 603, 605, 607.

The process 800 further moves to a block 814. At the block 814, the processor 102 determines the soft skin tissue thickness "t" at the predetermined anatomical positions on the face 200. More particularly, the processor 102 determines distribution of the soft skin tissue thickness "t" across the skin deformation regions 603, 605, 607 and utilizes the same to normalize the deformation distribution. After determining the values of the soft skin tissue thickness "t" at the predetermined anatomical positions, the processor 102 moves to a block 816. At the block 816, the processor 102 determines the first ratio "u/t" at the predetermined anatomical positions and adds them all together. However, in some instances, the processor 102 moves to a block 818 if determination of the soft skin tissue thickness "t" at the predetermined anatomical positions is not feasible. At the block 818, the processor 102 retrieves the stored data for the soft skin tissue thickness "t" at the predetermined anatomical positions based on multiple previous assessments of the individual wearer and the aggregated data from the number of previous wearers. In other words, at the block 818, the processor 102 receives the data pertaining to the soft skin tissue thickness "t" from the database 108. The process 800 moves to the block 816 to determine the values of the first ratio "u/t" at the predetermined anatomical positions and add them all together.

The process 800 further moves to a block 820. At the block 820, the processor 102 determines the $CT_d$ value. The $CT_d$ value may be determined by varying the relative skin deformation levels under the PPE 406 and asking the wearer to rate how much pressure is perceived and how comfortable these displacements are for the PPE 406 in use. After determining the $CT_d$ value, the process 800 moves to a block 822. At the block 822, the CM is computed by using Equation 2. However, in some cases, the process 800 moves to a block 824 if the determination of the $CT_d$ value is not feasible. At the block 824, the processor 102 receives the $CT_d$ value from a previous comfort trial with same type of wearers. The process 800 then moves to the block 822 to determine the CM by using Equation 2.

The process 800 then moves to a block 826. At the block 826, the processor 102 determines the PPT values at the predetermined anatomical positions. After determining the PPT values at the predetermined anatomical positions, the process 800 moves to a block 828. At the block 828, the processor 102 computes the CMP by using the PPT values in Equation 3. However, in some cases, the process 800 moves to a block 830 if the determination of the PPT values is not feasible. At the block 830, the processor 102 receives the PPT values at the predetermined anatomical positions from the database 108. After receiving the PPT values, the process 800 moves to the block 828 to determine the CMP by using the PPT values in Equation 3.

Further, the process 800 moves to a block 832. At the block 832, the output module 104 provides the notification corresponding to the CMP that is determined by the processor 102. The notification corresponding to the CMP may be provided to the individual wearer, the PPE selector, the PPE designer/manufacturer, and/or the control station. In some embodiments, the output module 104 may generate a visual notification of the value of the CMP on a display panel. In some embodiments, the output module 104 may generate an audible signal to announce the value of the CMP by using a speaker. In some other embodiments, the output module 104 may generate a printed report summary of the CMP.

Figure 9:
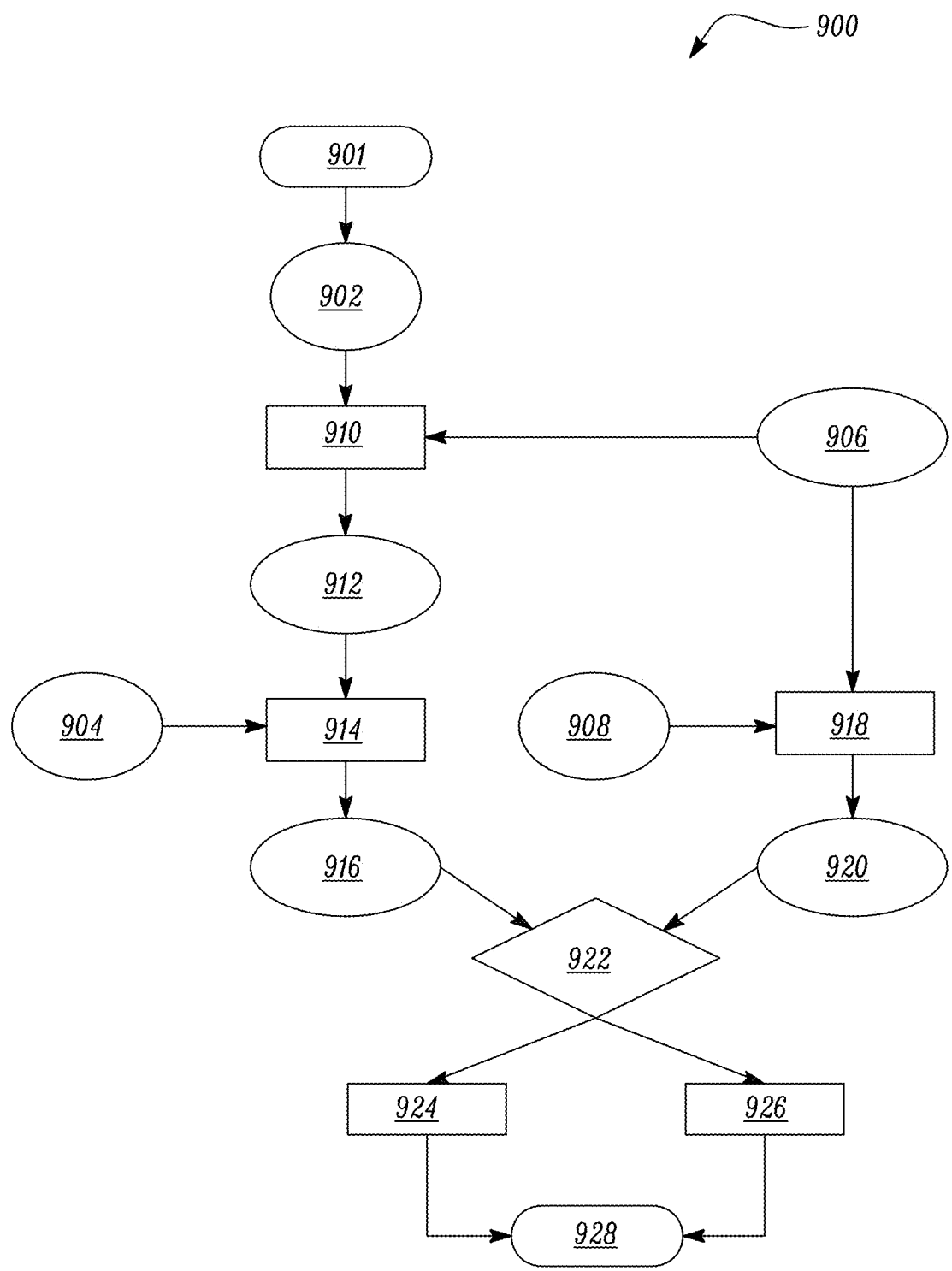
FIG. 9 illustrates a flowchart for a process for determining a comfort metric of the PPE for the individual wearer, according to an embodiment of the present disclosure.

Referring to FIG. 9, a flowchart for a process 900 for determining the sealing effectiveness factor of the PPE 406 is illustrated. The process 900 is embodied as a logic/algorithm implemented by the processor 102 and may be stored in the memory 106 of the system 100.

The processor 102 is configured to receive a raw point cloud data to automate contour data measurement. It is assumed that all point clouds are appropriately registered to each other so that direct comparisons can be made between point clouds. Registration can be done via the iterative closest point algorithm, or a similar registration technique.

The process 900 begins operation at a block 901. The process 900 moves from the block 901 to a block 902. At the block 902, the processor 102 receives a first point cloud representing measurements of the head 210 of the individual wearer with the PPE 406. At a block 904, the processor 102 receives a second point cloud representing measurements of the head 210 without the PPE 406. The head 210 may be scanned by the 3D scanner 110 to take the measurements. At a block 906, the processor 102 receives an external point cloud of the PPE 406 from the 3D scanner 110. At a block 908, the processor 102 receives an internal point cloud of the PPE 406 from the 3D scanner 110.

Further, at a block 910, the processor 102 receives data that is determined at the blocks 902, 906. More particularly, at the block 910, the processor 102 receives the first point cloud and the exterior point cloud from the blocks 902, 906, respectively. At the block 910, the processor 102 is configured to segment the first point cloud by using the exterior point cloud as an archetype. By segmentation operation, the first point cloud is split into two point clouds, i.e., a third point cloud related to the PPE 406 that conforms to the face 200 and a fourth point cloud related to the remaining structure of the head 210 without the PPE 406. In some embodiments, the segmentation operation can be done in a number of ways, such as using a color threshold approach from a Red Green Blue (RGB) point cloud or template matching.

The process 900 then moves from the block 910 to a block 912. At the block 912, the processor 102 discards the fourth point cloud, and processes only the third point cloud. Further, the process 900 moves from the block 912 to a block 914. At the block 914, the processor 102 receives data pertaining to the second point cloud and the third point cloud from the blocks 904, 912, respectively. At the block 914, the processor 102 determines a first minimum distance between the second point cloud and the third point cloud. The process 900 then moves from the block 914 to a block 916. At the block 916, the processor 102 determines a first thickness of the PPE 406 based on the first minimum distance calculated at the block 914.

Furthermore, at a block 918, the processor 102 receives data from the blocks 906, 908. More particularly, at the block 918, the processor 102 receives the exterior point cloud and the interior point cloud from the blocks 906, 908, respectively. At the block 918, the processor 102 determines a second minimum distance between the exterior point cloud and the interior point cloud. The process 900 then moves from the block 918 to a block 920. At the block 920, the processor 102 determines a second thickness of the PPE 406 based on the second minimum distance calculated at the block 918.

Further, at a block 922, the processor 102 receives data from the blocks 916, 920. More particularly, at the block 922, the processor 102 receives the first thickness and the second thickness of the PPE 406 from the blocks 916, 920, respectively. The processor 102 further compares the first thickness with the second thickness of the PPE 406 to determine the sealing effectiveness factor of the PPE 406 for the individual wearer.

If the sealing effectiveness factor is high, the process 900 moves from the block 922 to a block 924. At the block 924, the processor 102 sends a command to the output module 104 to notify a value of the high sealing effectiveness factor. On the other hand, if the sealing effectiveness factor is low, the process 900 moves from the block 922 to a block 926. At the block 926, the processor 102 sends a command to the output module 104 to notify a value of the low sealing effectiveness factor and regions of low sealing quality. In some embodiments, the output module 104 may notify the value of high or low sealing effectiveness factor using a display panel or a speaker. In other embodiments, the output module 104 may generate the value of high or low sealing effectiveness factor in a printed report summary. After the processor 102 determines the sealing effectiveness factor, the process 900 ends the operation at a block 928.

Figure 10:
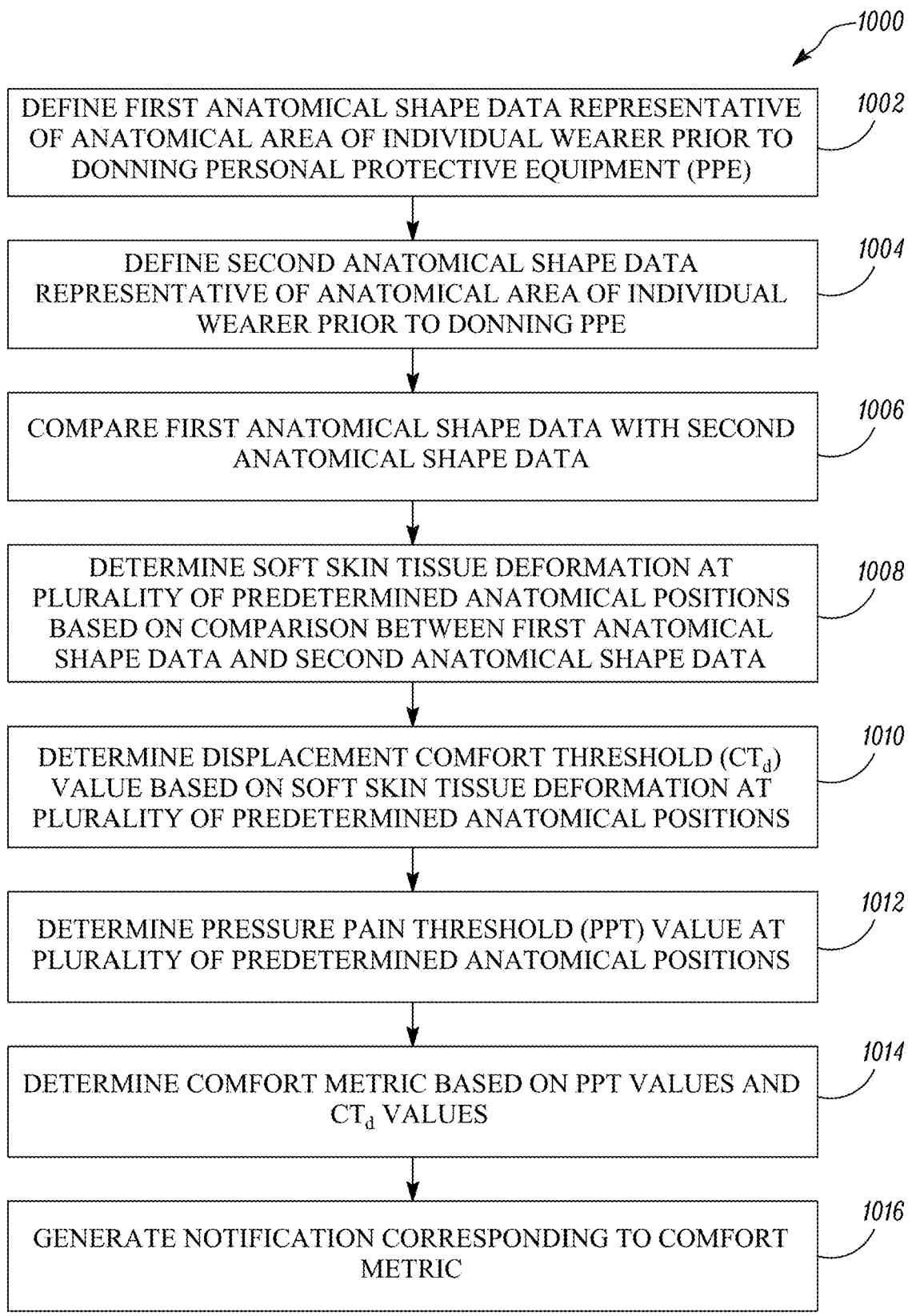
FIG. 10 is a flowchart for a method for determining PPE comfort for the individual wearer, according to an embodiment of the present disclosure.

Referring to FIG. 10, a flowchart for a method 1000 for determining PPE comfort for the individual wearer is illustrated. At step 1002, the method 1000 includes defining the first anatomical shape data representative of the anatomical area of the individual wearer prior to donning the PPE 406. At step 1004, the method 1000 includes defining the second anatomical shape data representative of the anatomical area of the individual wearer after donning the PPE 406. The steps 1004, 1006 of defining the first anatomical shape data and the second anatomical shape data includes scanning the anatomical area of the individual wearer prior to donning the PPE 406 and after donning the PPE 406 using the at least one 3D scanner 110. At step 1006, the method 1000 includes comparing the first anatomical shape data with the second anatomical shape data.

At step 1008, the method 1000 includes determining the soft skin tissue deformation "u" at the plurality of predetermined anatomical positions based on the comparison between the first anatomical shape data and the second anatomical shape data. The plurality of predetermined anatomical positions are generated based on at least two dynamic movements performed by the individual wearer.

At step 1010, the method 1000 includes determining the $CT_d$ value based on the soft skin tissue deformation "u" at the plurality of predetermined anatomical positions. At step 1012, the method 1000 includes determining the PPT value at the plurality of predetermined anatomical positions. At step 1014, the method 1000 includes determining the CMP based on the PPT value and the $CT_d$ values. Further, the method 1000 includes determining the soft skin tissue thickness "t" at the plurality of predetermined anatomical positions. In some embodiments, the processor 102 is configured to retrieve stored data for the soft skin tissue thickness "t" at the plurality of predetermined anatomical positions based on at least one of the previous assessment of the individual wearer and the aggregated data from the plurality of previous wearers. Moreover, the method 1000 includes determining the first ratio "u/t" between the determined soft skin tissue deformation "u" and the soft skin tissue thickness "t" at the plurality of predetermined anatomical positions. Further, the method 1000 includes determining the CMP based on the PPE value, the $CT_d$ values, and the first ratio "u/t".

The method 1000 also includes correlating the soft skin tissue deformation "u" at the plurality of predetermined anatomical positions for each individual wearer and the pressure applied by the PPE 406 at the plurality of predetermined anatomical positions for each individual wearer. The method 1000 further includes aggregating the correlation for generating the $CM_{PRE}$. Moreover, the method 1000 includes comparing the CMP to the $CM_{PRE}$. At step 1016, the method 1000 includes generating the notification corresponding to the CMP.

According to an embodiment, the method 1000 also includes defining, by the processor 102, the plurality of predetermined setting ranges for adjusting the at least one adjustable feature on the PPE 406. The plurality of predetermined setting ranges are defined based on at least one of the fit of the PPE 406 and the comfort of the PPE 406. The method 1000 further includes notifying the individual wearer of the predetermined setting range from the plurality of predetermined setting ranges for adjusting the at least one adjustable feature.

In some embodiments, the method 1000 includes the step of defining the first PPE shape data before donning the PPE 406 by the individual wearer and the second PPE shape data after donning the PPE 406 by the individual wearer. Further, the method 1000 includes determining the first contour data of the PPE 406 based on the first PPE shape data. The method 1000 also includes determining the second contour data based on the second PPE shape data and the second anatomical shape data. Further, the method 1000 includes comparing the first contour data with the second contour data. Furthermore, the method 1000 includes generating the notification for the individual wearer based on the comparison between the first contour data and the second contour data. The method 1000 also includes providing the notification indicative of the fit of the PPE 406 on the individual wearer. The method 1000 further includes providing the notification on the color-coded display for overlaying one or more colors indicative of the fit of the PPE 406.

In one embodiment, the method 1000 includes accessing information pertaining to the plurality of PPE sizes for the PPE type. The method 1000 also includes comparing, for the individual wearer, the first anatomical shape data with the second anatomical shape data. The method 1000 further includes predicting the PPE size for the individual wearer from the plurality of PPE sizes based on the comparison between the first anatomical shape data with the second anatomical shape data. Furthermore, the method 1000 includes generating the notification for the individual wearer pertaining to the predicted PPE size.

In another embodiment, the method 1000 includes accessing information pertaining to the plurality of PPE types and the plurality of PPE sizes from the predetermined library to predict, for the individual wearer, at least one of the PPE type from the plurality of PPE types and the PPE size from the plurality of PPE sizes.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A method for determining personal protective equipment (PPE) comfort for an individual wearer, the method comprising:
defining a first anatomical shape data representative of an anatomical area of the individual wearer prior to donning a PPE;
defining a second anatomical shape data representative of the anatomical area of the individual wearer after donning the PPE;
comparing the first anatomical shape data with the second anatomical shape data;
determining a soft skin tissue deformation at a plurality of predetermined anatomical positions based on the comparison between the first anatomical shape data and the second anatomical shape data;
determining a displacement comfort threshold ($CT_d$) value based on the soft skin tissue deformation at the plurality of predetermined anatomical positions;
determining a pressure pain threshold (PPT) value at the plurality of predetermined anatomical positions;
determining a comfort metric based on the PPT values and the $CT_d$ values; and
generating a notification corresponding to the comfort metric.

2. The method of claim 1, wherein the steps of defining the first anatomical shape data and the second anatomical shape data further comprises scanning the anatomical area of the individual wearer prior to donning the PPE and after donning the PPE using at least one three-dimensional scanner.

3. The method of claim 1, further comprising:
defining a plurality of predetermined setting ranges for adjusting at least one adjustable feature on the PPE, wherein the plurality of predetermined setting ranges are defined based on at least one of a fit of the PPE and a comfort of the PPE; and
generating a notification for a predetermined setting range from the plurality of predetermined setting ranges for adjusting the at least one adjustable feature.

4. The method of claim 1, further comprising determining a soft skin tissue thickness at the plurality of predetermined anatomical positions.

5. The method of claim 1, further comprising comparing the individual wearer comfort metric to a predicted wearer comfort metric.

6. The method of claim 1, further comprising a step of generating the plurality of predetermined anatomical positions based on at least two dynamic movements performed by the individual wearer.

7. The method of claim 1, further comprising a step of defining a first PPE shape data before donning the PPE by the individual wearer and a second PPE shape data after donning the PPE by the individual wearer.

8. The method of claim 7, further comprising:
determining a first contour data of the PPE based on the first PPE shape data;
determining a second contour data based on the second PPE shape data and the second anatomical shape data;
comparing the first contour data with the second contour data; and
generating a notification for the individual wearer based on the comparison between the first contour data and the second contour data.

9. A system for determining personal protective equipment (PPE) comfort for an individual wearer, the system comprising:
a processor configured to:
define a first anatomical shape data representative of an anatomical area of the individual wearer prior to donning a PPE;
define a second anatomical shape data representative of the anatomical area of the individual wearer after donning the PPE;
compare the first anatomical shape data with the second anatomical shape data;

determine a soft skin tissue deformation at a plurality of predetermined anatomical positions based on the comparison between the first anatomical shape data and the second anatomical shape data;

determine a displacement comfort threshold $CT_d$ value based on the soft skin tissue deformation at the plurality of predetermined anatomical positions;

determine a pressure pain threshold (PPT) value at the plurality of predetermined anatomical positions; and determine a comfort metric based on the PPT values and the $CT_d$ values; and an output module communicably coupled with the processor, wherein the output module is configured to provide a notification corresponding to the comfort metric received from the processor thereon.

10. The system of claim 9, wherein the plurality of predetermined anatomical positions are generated using a static modeling module.

11. The system of claim 9, wherein the plurality of predetermined anatomical positions are generated using a dynamic modeling module.

12. The system of claim 9, wherein the first anatomical shape data and the second anatomical shape data is defined based on scanning the anatomical area of the individual wearer prior to donning the PPE and after donning the PPE using at least one three-dimensional scanner.

13. The system of claim 9, wherein the processor is further configured to:

define a plurality of predetermined setting ranges for adjusting at least one adjustable feature on the PPE, wherein the plurality of predetermined setting ranges are defined based on at least one of a fit of the PPE and a comfort of the PPE; and generating a notification for a predetermined setting range from the plurality of predetermined setting ranges for adjusting the at least one adjustable feature.

14. The system of claim 9, wherein the processor is further configured to determine a soft skin tissue thickness at the plurality of predetermined anatomical positions.

15. The system of claim 9, wherein the processor is further configured to compare the individual wearer comfort metric to a predicted wearer comfort metric.

16. The system of claim 9, wherein the processor is further configured to generate the plurality of predetermined anatomical positions based on at least two dynamic movements performed by the individual wearer.

17. The system of claim 9, wherein the processor is further configured to define a first PPE shape data before donning the PPE by the individual wearer and a second PPE shape data after donning the PPE by the individual wearer.

18. The system of claim 17, wherein the processor is further configured to:

determine a first contour data of the PPE based on the first PPE shape data;

determine a second contour data based on the second PPE shape data and the second anatomical shape data;

compare the first contour data with the second contour data; and generate a notification for the individual wearer based on the comparison between the first contour data and the second contour data.

19. The system of claim 17, wherein the processor is further configured to:

access information pertaining to a plurality of PPE sizes for a PPE type;

compare, for the individual wearer, the first anatomical shape data with the second anatomical shape data;

predict a PPE size for the individual wearer from the plurality of PPE sizes based on the comparison between the first anatomical shape data and the second anatomical shape data; and generate a notification for the individual wearer pertaining to the predicted PPE size.

20. The system of claim 17, wherein the processor is further configured to access information pertaining to a plurality of PPE types and a plurality of PPE sizes from a predetermined library to predict, for the individual wearer, at least one of a PPE type from the plurality of PPE types and a PPE size from the plurality of PPE sizes.

* * * * *